United States Patent
Yoshida et al.

(10) Patent No.: US 6,923,547 B2
(45) Date of Patent: Aug. 2, 2005

(54) MIRROR DEVICE FOR VEHICLE, AND RETRACTING MECHANISM OF OUTER MIRROR DEVICE FOR VEHICLE

(75) Inventors: Shigeki Yoshida, Aichi-ken (JP); Narumi Ishigami, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 10/725,503

(22) Filed: Dec. 3, 2003

(65) Prior Publication Data

US 2004/0109248 A1 Jun. 10, 2004

(30) Foreign Application Priority Data

Dec. 4, 2002 (JP) ........................................ 2002-352475

(51) Int. Cl.[7] .......................... G02B 5/08; G02B 7/182; B60R 1/06
(52) U.S. Cl. ........................................ 359/841; 359/877
(58) Field of Search ................................ 359/841, 872, 359/877

(56) References Cited

U.S. PATENT DOCUMENTS

| | | | | |
|---|---|---|---|---|
| 4,153,342 A | * | 5/1979 | Mittelhauser | 359/874 |
| 4,158,483 A | * | 6/1979 | Fisher et al. | 359/876 |
| 4,787,726 A | * | 11/1988 | Hendricks | 359/877 |
| 5,020,896 A | * | 6/1991 | Vercesi et al. | 359/876 |
| 5,172,884 A | * | 12/1992 | Ishiyama | 248/479 |
| 5,432,641 A | * | 7/1995 | Mochizuki | 359/841 |
| 5,636,071 A | * | 6/1997 | Mochizuki et al. | 359/877 |
| 5,781,354 A | * | 7/1998 | Sakata | 359/841 |
| 6,022,113 A | * | 2/2000 | Stolpe et al. | 359/841 |
| 6,322,221 B1 | * | 11/2001 | van de Loo | 359/841 |
| 6,679,610 B2 | * | 1/2004 | Yamauchi | 359/841 |
| 6,793,358 B2 | * | 9/2004 | Sakata | 359/872 |
| 2003/0011907 A1 | * | 1/2003 | Yamauchi et al. | 359/872 |

FOREIGN PATENT DOCUMENTS

| | | | |
|---|---|---|---|
| JP | 63082844 | * | 1/1988 |
| JP | 2002-67805 | | 3/2002 |
| JP | 2002-274267 | * | 9/2002 |

* cited by examiner

*Primary Examiner*—Ricky D. Shafer
(74) *Attorney, Agent, or Firm*—Nixon Peabody LLP

(57) ABSTRACT

In a door mirror device for a vehicle, a first helical gear and a second worm gear are rotated integrally by a first worm gear. In this way, the second worm gear is rotated around a second helical gear, and a mirror is retracted or extended. The first helical gear and the second worm gear can tilt. Rotating central shafts thereof are supported at both ends by first bearings and second bearings, respectively. Even if load is applied from the first worm gear or the second helical gear to the first helical gear or the second worm gear, it is possible to suppress integral tilting of the first helical gear and the second worm gear. Accordingly, when the mirror is retracted and when the mirror is extended, it is possible to suppress a change in a sound of operation and to make the sound of operation uniform.

20 Claims, 4 Drawing Sheets

VEHICLE-INNER SIDE

VEHICLE-OUTER SIDE

VEHICLE-INNER SIDE ← → VEHICLE-OUTER SIDE

MIRROR DEVICE FOR VEHICLE, AND RETRACTING MECHANISM OF OUTER MIRROR DEVICE FOR VEHICLE

CROSS-REFERENCE TO RELATED APPLICATION

This application claims priority under 35 USC 119 from Japanese Patent Applications No. 2002-352475, the disclosures of which are incorporated by reference herein.

BACKGROUND OF THE INVENTION

1. Field of the Invention

The present invention relates to a mirror device for a vehicle and to a retracting mechanism of an outer mirror device for a vehicle, which are provided at a vehicle.

2. Description of the Related Art

Among door mirror devices for vehicles, there are those which are provided with a retracting mechanism (see, for example, Japanese Patent Application Laid-Open (JP-A) No. 2002-67805). Such a retracting mechanism has, for example, a supporting shaft. The supporting shaft is fixed to a vehicle body. Within a case member (which will be described hereinafter), a second helical gear is provided at the supporting shaft in a state in which rotation of the second helical gear is impeded.

The retracting mechanism has the case member, which is supported at the supporting shaft so as to be freely rotatable. A mirror for viewing the region toward the rear of the vehicle is connected to the case member. The case member is always rotated integrally with the mirror.

A motor is fixed within the case member. A first worm gear is provided at the output shaft of the motor. A twin gear is provided within the case member. The twin gear has a first helical gear and a second worm gear. The first helical gear is meshed with the first worm gear. Due to the first helical gear being rotated by rotation of the first worm gear by the driving of the motor, the twin gear is rotated, and the second worm gear is rotated integrally with the first helical gear. The second worm gear is meshed with a second helical gear. Due to the second worm gear being rotated, the second worm gear is rotated around the second helical gear. In this way, the case member is rotated around the supporting shaft, and the mirror is retracted or extended.

However, in this door mirror device for a vehicle, the first helical gear and the second worm gear of the twin gear are integral. Therefore, when load is applied from the first worm gear to the first helical gear, or when load is applied from the second helical gear to the second worm gear, the second worm gear is affected by the tilting of the first helical gear, and the second worm gear tilts integrally with the first helical gear. Further, the first helical gear is affected by the tilting of the second worm gear, and the first helical gear tilts integrally with the second worm gear.

Accordingly, there is the problem that the sound of the operation changes between when the twin gear is rotated in one direction and the mirror is retracted, and when the twin gear is rotated in the other direction and the mirror is extended.

SUMMARY OF THE INVENTION

In view of the aforementioned, an object of the present invention is to provide a mirror device for a vehicle and a retracting mechanism of an outer mirror device for a vehicle, in which the sound of operation is made uniform.

In a first aspect of the present invention, a mirror device for a vehicle comprises: a first gear which is rotatable; and a second gear which is connected to the first gear so as to be tiltable, and due to the first gear being rotated, the second gear is rotated integrally with the first gear, and a mirror for a vehicle is thereby rotated.

In the mirror device for a vehicle based on the present aspect, the first gear and the second gear are connected. Due to the first gear being rotated, the second gear is rotated integrally with the first gear, and the mirror for a vehicle is rotated.

In the present aspect, the first gear and the second gear are connected so as to both be tiltable. Therefore, even when load is applied to the first gear or the second gear, it is possible to prevent the second gear from receiving the effect of the tilting force which the first gear receives. Accordingly, integral tilting of the second gear with the first gear can be suppressed. Moreover, it is possible to prevent the first gear from receiving the effect of the tilting force which the second gear receives. Accordingly, integral tilting of the first gear with the second gear can be suppressed.

Therefore, when the first gear and the second gear are rotated in one direction, and when the first gear and the second gear are rotated in the other direction, it is possible to suppress a change in the sound of operation and to make the sound of operation uniform (unchanged).

In a second aspect of the present invention, the mirror device for a vehicle of the above-described first aspect further comprises at least one of: first bearings supporting a rotating central shaft of the first gear at both sides of the first gear; and second bearings supporting a rotating central shaft of the second gear at both sides of the second gear.

The mirror device for a vehicle based on the present aspect has at least one of first bearings supporting the rotating central shaft of the first gear at both sides of the first gear, and second bearings supporting the rotating central shaft of the second gear at both sides of the second gear.

Therefore, although the first gear and the second gear are structured so as to both be tiltable, the first gear and the second gear can be connected together very well, and the first gear and the second gear can be made to integrally rotate well.

Namely, in a case in which the first bearings are provided, the tilting force which the first gear receives is received well by the first bearings. Accordingly, tilting of the first gear can be suppressed well. Moreover, in a case in which the second bearings are provided, the tilting force which the second gear receives is received well by the second bearings. Accordingly, tilting of the second gear can be suppressed well.

Therefore, in the present aspect of the invention, even when load is applied to the first gear or the second gear, it is possible to further prevent the second gear from receiving the effects of the tilting force which the first gear receives. Accordingly, integral tilting of the second gear with the first gear can be suppressed even more effectively. Moreover, it is possible to further prevent the first gear from receiving the effects of the tilting force which the second gear receives. Accordingly, integral tilting of the first gear with the second gear can be suppressed even more effectively.

Accordingly, when the first gear and the second gear are rotated in one direction, and when the first gear and the second gear are rotated in the other direction, the change in the sound of operation can be suppressed even more, and the sound of operation can be made uniform even more.

In a third aspect of the present invention, a retracting mechanism of an outer mirror device for a vehicle comprises: a connecting member connected to an outer mirror for a vehicle; a first worm gear which is provided at an output shaft of a motor provided at the connecting member, and which is rotated due to the motor being driven; a first helical gear which is provided at the connecting member, and which is engaged with the first worm gear, and which is rotated due to the first worm gear being rotated; a second worm gear which is provided at the connecting member, and which is tiltably connected to the first helical gear, and which is rotated integrally with the first helical gear due to the first helical gear being rotated; and a second helical gear which is connected to a vehicle body and which is engaged with the second worm gear, and due to the second worm gear being rotated, the second worm gear is rotated around the second helical gear and the outer mirror is thereby rotated together with the connecting member.

In the retracting mechanism of an outer mirror device for a vehicle based on the present aspect, the connecting member is connected to an outer mirror. The first worm gear, which is provided at an output shaft of a motor at the connecting member, is engaged with the first helical gear at the connecting member. The first helical gear is connected to the second worm gear at the connecting member. The second worm gear is engaged with the second helical gear which is connected to a vehicle body. Therefore, due to the motor being driven, the first worm gear, the first helical gear, and the second worm gear are rotated, and the second worm gear is rotated around the second helical gear. In this way, the outer mirror is rotated together with the connecting member (including the motor, the first worm gear, the first helical gear, and the second worm gear) around the second helical gear, and the outer mirror is retracted or extended.

Here, the first helical gear and the second worm gear are both tiltable. Therefore, even when load is applied from the first worm gear to the first helical gear, it is possible to prevent the second worm gear from receiving the effects of the tilting force which the first helical gear receives from the first worm gear. Accordingly, integral tilting of the second worm gear with the first helical gear can be suppressed. Moreover, even when load is applied from the second helical gear to the second worm gear, it is possible to prevent the first helical gear from receiving the effects of the tilting force which the second worm gear receives from the second helical gear. Accordingly, integral tilting of the first helical gear with the second worm gear can be suppressed. In this way, when the first helical gear and the second worm gear are rotated in one direction and the outer mirror is retracted, and when the first helical gear and the second worm gear are rotated in the other direction and the outer mirror is extended, a change in the sound of operation can be suppressed, and the sound of operation can be made uniform.

DETAILED DESCRIPTION OF THE INVENTION

Figure 3:
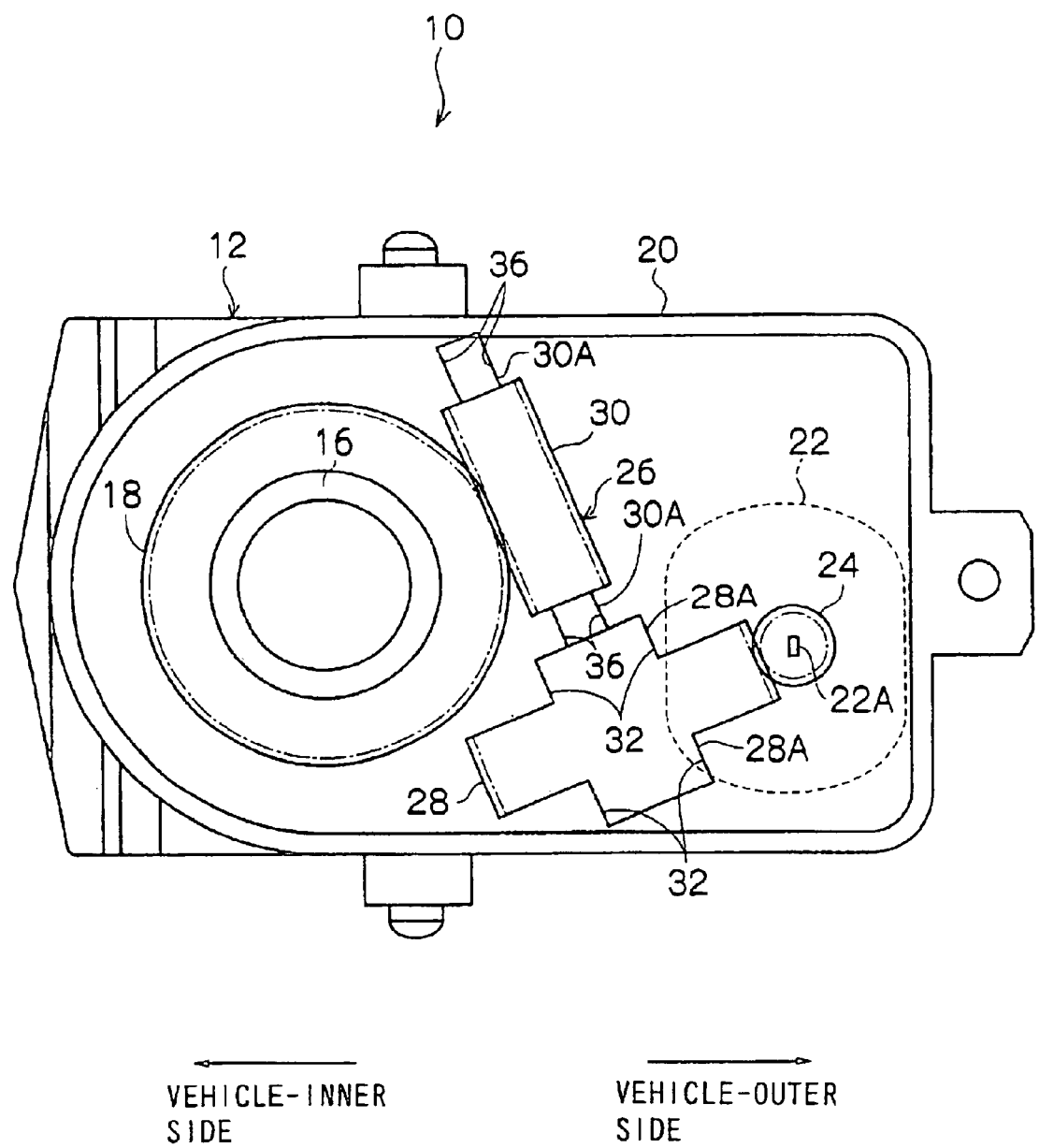
FIG. 3 is a plan view, taken along line 3—3 of FIG. 4, of the retracting mechanism of the door mirror device for a vehicle relating to the embodiment of the present invention.
Figure 4:
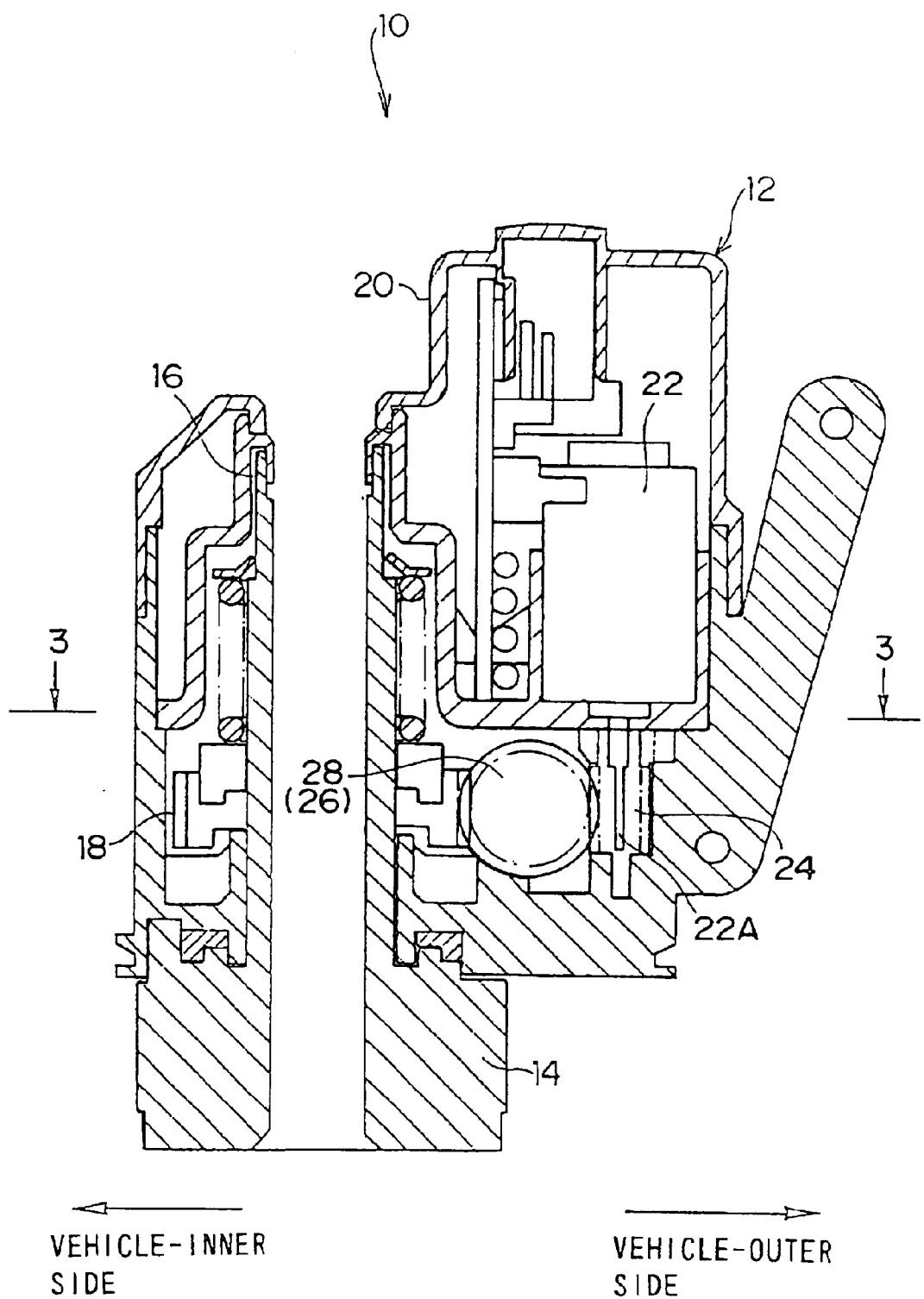
FIG. 4 is a vertical sectional view showing the retracting mechanism of the door mirror device for a vehicle relating to the embodiment of the present invention.

Main portions of a door mirror device 10 for a vehicle (a mirror device for a vehicle and an outer mirror device for a vehicle), which relates to an embodiment to which are applied the mirror device for a vehicle and the retracting mechanism of an outer mirror device for a vehicle of the present invention, are shown in a vertical sectional view in FIG. 4. The main portions of the door mirror device 10 for a vehicle are shown in FIG. 3 in a plan view as seen from line 3—3 of FIG. 4.

The door mirror device 10 for a vehicle relating to the present embodiment is equipped with a retracting mechanism 12. A stand 14 is provided at the retracting mechanism 12. The stand 14 is fixed to a door mirror stay (not illustrated) which is fixed to a door of the vehicle. A supporting shaft 16, which is substantially cylindrical, stands erect integrally at the stand 14. The supporting shaft 16 is inserted through a second helical gear 18 in a state in which rotation of the second helical gear 18 is prevented.

The retracting mechanism 12 has a box-shaped case member 20 which serves as a connecting member. The supporting shaft 16 is inserted in the vehicle inner side region of the case member 20, such that the case member 20 is supported at the supporting shaft 16 so as to be freely rotatable. The case member 20 is connected to a mirror for viewing the region toward the rear of the vehicle, which serves as an outer mirror, via a frame and a mirror surface angle adjusting mechanism. (None of the mirror, the frame and the mirror surface angle adjusting mechanism is illustrated). The case member 20 is always rotated integrally with the mirror.

A motor 22 is provided at the top portion of the vehicle outer side region of the interior of the case member 20. An output shaft 22A of the motor 22 projects downward from the motor 22. A first worm gear 24 is provided at the output shaft 22A of the motor 22. Due to the motor 22 being driven, the first worm gear 24 is rotated integrally with the output shaft 22A.

A twin gear 26 is provided at the lower portion of the vehicle outer side region of the interior of the case member 20. The twin gear 26 has a first helical gear 28 serving as a first gear. The first helical gear 28 is meshed with the aforementioned first worm gear 24. Moreover, the twin gear 26 has a second worm gear 30 serving as a second gear. The second worm gear 30 is meshed with the aforementioned second helical gear 18.

Figure 1:
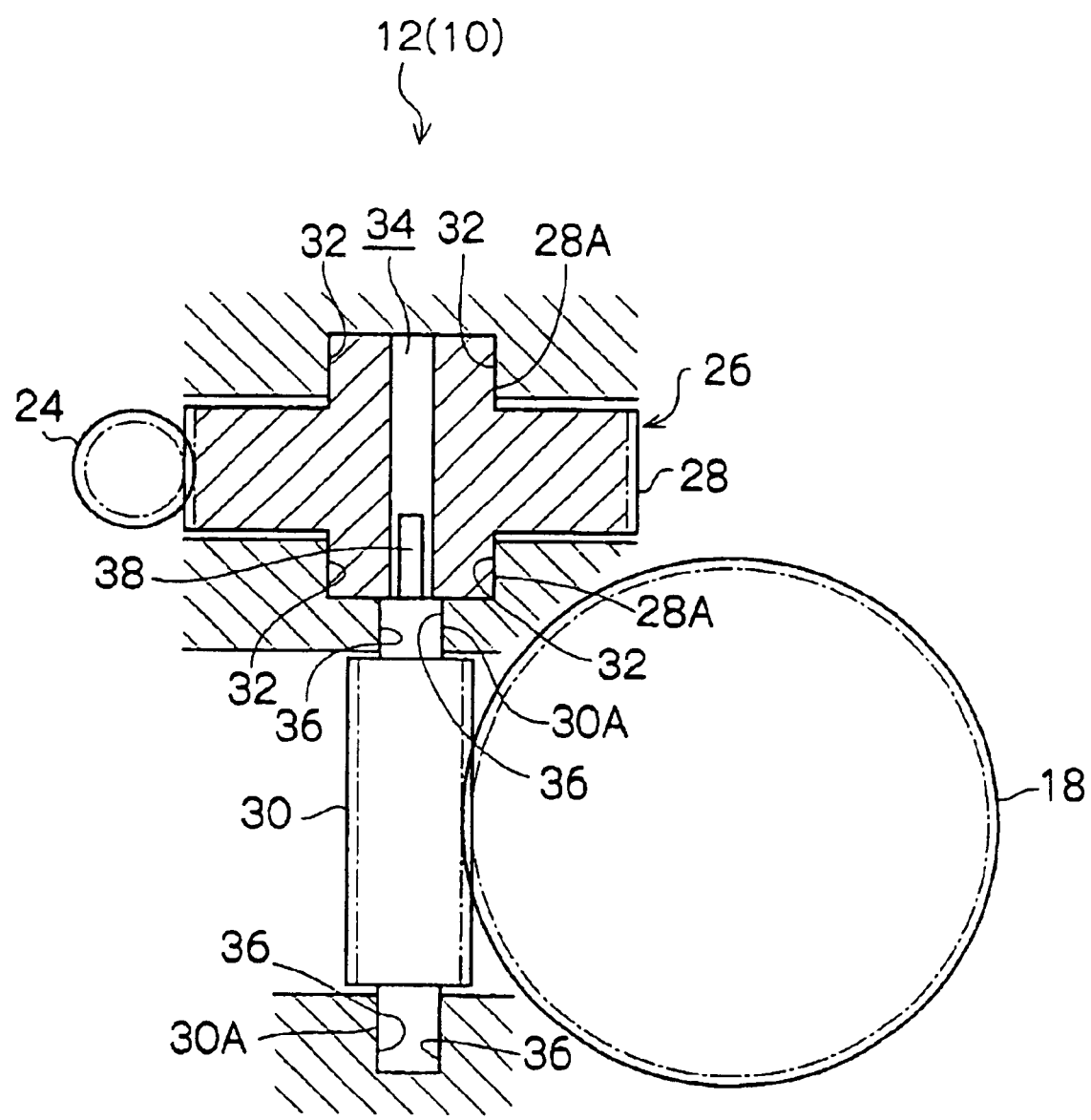
FIG. 1 is a plan view showing main portions of a retracting mechanism of a door mirror device for a vehicle relating to an embodiment of the present invention.

As shown in detail in FIG. 1, a rotating central shaft 28A of the first helical gear 28 is supported (pivotally supported) by first bearings 32 at both sides of the first helical gear 28 (i.e., at both ends of the rotating central shaft 28A). A connecting hole 34 is formed so as to pass through the rotating central shaft 28A along the axial direction.

A rotating central shaft 30A of the second worm gear 30 is supported (pivotally supported) by second bearings 36 at both sides of the second worm gear 30 (i.e., at both ends of the rotating central shaft 30A). A connecting shaft 38 is provided integrally at the first helical gear 28 side end of the rotating central shaft 30A. The connecting shaft 38 is always rotated integrally with the second worm gear 30. The connecting shaft 38 is inserted in the connecting hole 34 of the first helical gear 28. The first helical gear 28 and the second worm gear 30 are thereby connected.

Figure 2A:
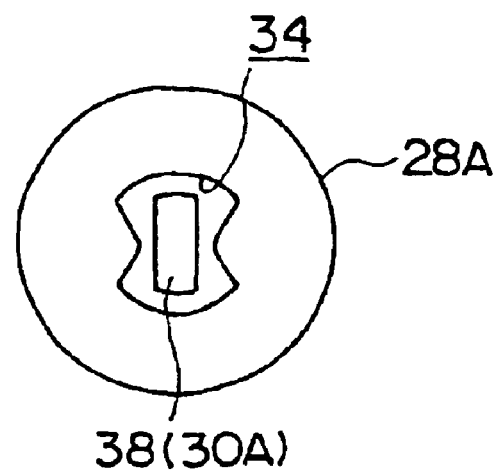
FIG. 2A is a sectional view showing an example of a connecting hole and a connecting shaft in the retracting mechanism of the door mirror device for a vehicle relating to the embodiment of the present invention.
Figure 2B:
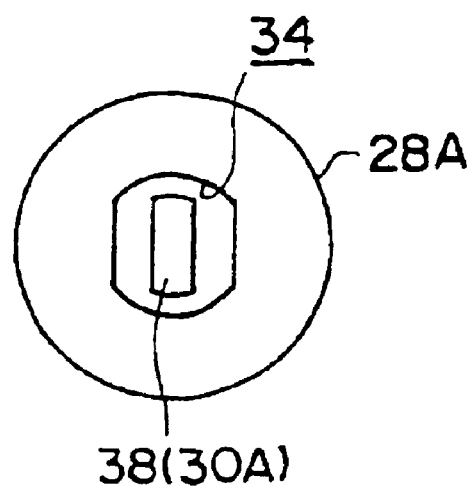
FIG. 2B is a sectional view showing another example of the connecting hole and the connecting shaft in the retracting mechanism of the door mirror device for a vehicle relating to the embodiment of the present invention.

Here, as shown in FIG. 2A for example, the connecting hole 34 may be formed in the shape of a substantially oval column which has a pair of curved side surfaces which oppose one another, and at which oval column the diameter between the other opposing side surfaces, in a cross-section orthogonal to the longitudinal direction, gradually decreases toward the longitudinal direction central portion, and the connecting shaft 38 may be formed as a substantially rectangular column. Or, as shown in FIG. 2B for example, the connecting hole 34 may be formed in the shape of a substantially oval column having a pair of opposing flat side surfaces, and the connecting shaft 38 may be formed as a substantially rectangular column.

In accordance with this structure, the first helical gear 28 and the second worm gear 30 can rotate integrally, and the first helical gear 28 and the second worm gear 30 can both tilt.

Therefore, due to the first worm gear 24 being rotated and the first helical gear 28 being rotated, the twin gear 26 is rotated, and the second worm gear 30 is rotated integrally with the first helical gear 28. In this way, due to the second worm gear 30 rotating (revolving) around the second helical gear 18, the case member 20 is rotated around the supporting shaft 16, and the mirror is retracted or extended.

Next, operation of the present embodiment will be described.

In the door mirror device 10 for a vehicle having the above-described structure, due to the motor 22 being driven and the first worm gear 24 being rotated, the first helical gear 28 and the second worm gear 30 of the twin gear 26 are rotated integrally. In this way, due to the second worm gear 30 being rotated around the second helical gear 18, the case member 20 is rotated around the supporting shaft 16, and the mirror is retracted or extended.

Here, in the twin gear 26, the first helical gear 28 and the second worm gear 30 can both tilt. Therefore, even when load is applied from the first worm gear 24 to the first helical gear 28, it is possible to prevent the second worm gear 30 from receiving the effects of the tilting force which the first helical gear 28 receives from the first worm gear 24. Accordingly, it is possible to suppress integral tilting of the second worm gear 30 with the first helical gear 28. Moreover, even when load is applied from the second helical gear 18 to the second worm gear 30, it is possible to prevent the first helical gear 28 from receiving the effects of the tilting force which the second worm gear 30 receives from the second helical gear 18. Accordingly, it is possible to suppress the integral tilting of the first helical gear 28 with the second worm gear 30.

In this way, when the twin gear 26 (the first helical gear 28 and the second worm gear 30) is rotated in one direction and the mirror is retracted, and when the twin gear 26 is rotated in the other direction and the mirror is extended, it is possible to suppress a change in the sound of the operation, and the sound of the operation can be made uniform (unchanged).

Moreover, the rotating central shaft 28A of the first helical gear 28 is supported by the first bearings 32 at the both sides of the first helical gear 28. The rotating central shaft 30A of the second worm gear 30 is supported by the second bearings 36 at the both sides of the second worm gear 30.

Therefore, even though the first helical gear 28 and the second worm gear 30 can both tilt, the first helical gear 28 and the second worm gear 30 can be connected together well, and the first helical gear 28 and the second worm gear 30 can be made to integrally rotate well.

The tilting force, which the first helical gear 28 receives from the first worm gear 24, can reliably be received by the first bearings 32. Accordingly, tilting of the first helical gear 28 can be suppressed well. Further, the tilting force, which the second worm gear 30 receives from the second helical gear 18, can be reliably received by the second bearings 36. Accordingly, tilting of the second worm gear 30 can be suppressed well.

Therefore, when load is applied from the first worm gear 24 to the first helical gear 28, it is possible to further prevent the second worm gear 30 from receiving the effects of the tilting force which the first helical gear 28 receives from the first worm gear 24. Accordingly, integral tilting of the second worm gear 30 with the first helical gear 28 can be suppressed even more effectively. Moreover, when load is applied from the second helical gear 18 to the second worm gear 30, it is possible to further prevent the first helical gear 28 from receiving the effects of the tilting force which the second worm gear 30 receives from the second helical gear 18. Accordingly, integral tilting of the first helical gear 28 with the second worm gear 30 can be suppressed even more effectively.

In this way, when the twin gear 26 is rotated in one direction and the mirror is retracted, and when the twin gear 26 is rotated in another direction and the mirror is extended, a change in the sound of operation can be suppressed even more, and the sound of operation can be made uniform even more.

Note that, in the present embodiment, the connecting hole 34 is provided in the rotating central shaft 28A of the first helical gear 28, and the connecting shaft 38 is provided at the rotating central shaft 30A of the second worm gear 30. However, a structure is possible in which a connecting shaft is provided at the rotating central shaft of the first helical gear (the first gear), and a connecting hole is provided in the rotating central shaft of the second worm gear (the second gear).

Moreover, in the present embodiment, the mirror device for a vehicle and retracting mechanism of an outer mirror device for a vehicle of the present invention are applied to the door mirror device 10 for a vehicle. However, the mirror device for a vehicle and retracting mechanism of an outer mirror device for a vehicle of the present invention may be applied to a fender mirror device for a vehicle or an inner mirror device for a vehicle.

As described above, in accordance with the mirror device for a vehicle of the present invention, a first gear and a second gear can both tilt. Therefore, when load is applied to the first gear or to the second gear, integral tilting of the first gear and the second gear can be suppressed, and the sound of operation can be made uniform (unchanged).

What is claimed is:

1. A mirror device for a vehicle comprising:
    a first gear which is rotatable;
    a second rotatable gear, and
    a tiltable coupling connecting the first gear and the second gear so that the axis of rotation of one of said gears is tiltable with respect to the other, such that a tilt force applied to one gear is not transmitted to the other when the first gear is rotated, wherein the second gear is rotated integrally with the first gear, and a mirror for a vehicle is thereby rotated.

2. The mirror device for a vehicle of claim 1, further comprising at least one of:
    first bearings supporting a rotating central shaft of the first gear at both sides of the first gear; and second bearings supporting a rotating central shaft of the second gear at both sides of the second gear.

3. The mirror device for a vehicle of claim 1, said coupling includes a connecting hole formed at a rotating central shaft of one of the first gear and the second gear, and a connecting shaft provided at a rotating central shaft of the other of the first gear and the second gear, and the first gear and the second gear are connected together via the connecting hole and the connecting shaft.

4. The mirror device for a vehicle of claim 3, wherein the connecting hole and the connecting shaft are structured such that the connecting shaft is able to tilt within the connecting hole wherein the connecting hole and the connecting shaft are engaged.

5. The mirror device for a vehicle of claim 4, wherein the connecting hole shaped as a substantially oval column which has a pair of curved side surfaces which pose one another, and at which oval column a diameter between other opposing side surfaces, in a cross-section orthogonal to a longitudinal direction, gradually decreases to a longitudinal direction central portion, and the connecting shaft is shaped as a substantially rectangular column.

6. The mirror device for a vehicle of claim 4, wherein the connecting hole shaped as a substantially oval column having a pair of opposing flat side surfaces, and the connecting shaft is shaped as a substantially rectangular column.

7. The mirror device for a vehicle of claim 1, further comprising a worm gear which is provided at an output shaft of a motor and which is rotated due to the motor being driven, wherein the first gear engages with the worm gear and the axis of rotation of the worm gear is tiltable with respect to the axis of rotation of the first gear.

8. The mirror device for a vehicle of claim 1, further comprising a helical gear which is connected to a vehicle body and which engages with the second gear, and as the second gear rotates, the second gear is rotated around the helical gear and the mirror is thereby rotated.

9. A mirror device for a vehicle comprising:
a first worm gear which is provided at an output shaft of a motor and which is rotated due to the motor being driven;
a first helical gear which is rotatable and engages with the first worm gear;
a second worm rotatable gear, a tiltable coupling connecting the second worm gear to the first helical gear so that the axis of rotation of said second worm gear is tiltable with respect to the axis of rotation of said first helical gear when said second worm gear, is rotated integrally with the first helical gear due to the first helical gear being rotated; and
a helical gear which is connected to a vehicle body and which engages with the second worm gear, and as the second worm gear rotates, the second worm gear is rotated around the helical gear and a mirror is thereby rotated.

10. The mirror device for a vehicle of claim 9, further comprising at least one of:
first bearings supporting a rotating central shaft of the first helical gear at both sides of the first helical gear; and
second bearings supporting a rotating central shaft of the second worm gear at both sides of the second worm gear.

11. The mirror device for a vehicle of claim 9, wherein said coupling includes a connecting hole formed at a rotating central shaft of one of the first helical gear and the second worm gear, and a connecting shaft provided at a rotating central shaft of the other of the first helical gear and the second worm gear, and the first helical gear and the second worm gear are connected together via the connecting hole and the connecting shaft.

12. The mirror device for a vehicle of claim 11, wherein the connecting hole and the connecting shaft are structured such that the connecting shaft is able to tilt within the connecting hole when the connecting hole and the connecting shaft are engaged.

13. The mirror device for a vehicle of claim 12, wherein the connecting hole is shaped as a substantially oval column which has a pair of curved side surfaces which oppose one another, and at which oval column a diameter between other opposing side surfaces, in a cross-section orthogonal to a longitudinal direction, gradually decreases toward a longitudinal direction central portion, and the connecting shaft is shaped as a substantially rectangular column.

14. The mirror device for a vehicle of claim 12, wherein the connecting hole is shaped as a substantially oval column having a pair of opposing flat side surfaces, and the connecting shaft is shaped as a substantially rectangular column.

15. A retracting mechanism of an outer mirror device for a vehicle, comprising:
a connecting member connected to an outer mirror for a vehicle;
a first worm gear which is provided at an output shaft of a motor provided at the connecting member, and which is rotated due to the motor being driven;
a first helical gear which is provided at the connecting member, and which is engaged with the first worm gear, and which is rotated due to the first worm gear being rotated;
a second rotatable worm gear which is provided at the connecting member,
a tiltable coupling connecting the second worm gear to the first helical gear so that the axes of rotation of said second worm gear and said first helical gear are mutually tiltable to one another when said second worm gear is rotated integrally with the first helical gear due to the first helical gear being rotated; and
a second helical gear which is connected to a vehicle body and which is engaged with the second worm gear, and due to the second worm gear being rotated, the second worm gear is rotated around the second helical gear and the outer mirror is thereby rotated together with the connecting member.

16. The retracting mechanism of an outer mirror device for a vehicle of claim 15, further comprising at least one of:
first bearings supporting a rotating central shaft of the first helical gear at both sides of the first helical gear; and
second bearings supporting a rotating central shaft of the second worm gear at both sides of the second worm gear.

17. The retracting mechanism of an outer mirror device for a vehicle of claim 15, wherein said coupling includes a connecting hole is formed at a rotating central shaft of one of the first helical gear and the second worm gear, and a connecting shaft is provided at a rotating central shaft of the other of the first helical gear and the second worm gear, and the first helical gear and the second worm gear are connected together via the connecting hole and the connecting shaft.

18. The retracting mechanism of an outer mirror device for a vehicle of claim 17, wherein the connecting hole and the connecting shaft are structured such that the connecting shaft is able to tilt within the connecting hole when the connecting hole and the connecting shaft are engaged.

19. The retracting mechanism of an outer mirror device for a vehicle of claim 18, wherein the connecting hole is shaped as a substantially oval column which has a pair of curved side surfaces which oval column oppose one another, and at which a diameter between other opposing side surfaces, in a cross-section orthogonal to a longitudinal direction, gradually decreases toward a longitudinal direction central portion, and the connecting shaft is shaped as a substantially rectangular column.

20. The retracting mechanism of an outer mirror device for a vehicle of claim 18, wherein the connecting hole is shaped as a substantially oval column having a pair of opposing flat side surfaces, and the connecting shaft is shaped as a substantially rectangular column.

* * * * *